(12) United States Patent
Haraguchi et al.

(10) Patent No.: US 8,292,142 B2
(45) Date of Patent: Oct. 23, 2012

(54) MANUAL BREAKER

(75) Inventors: Hirotake Haraguchi, Suita (JP); Kazuya Maekawa, Suita (JP)

(73) Assignee: Mitsuboshi Diamond Industrial Co., Ltd., Osaka (JP)

(*) Notice: Subject to any disclaimer, the term of this patent is extended or adjusted under 35 U.S.C. 154(b) by 233 days.

(21) Appl. No.: 12/669,298

(22) PCT Filed: Jun. 16, 2008

(86) PCT No.: PCT/JP2008/001543
§ 371 (c)(1),
(2), (4) Date: Apr. 27, 2010

(87) PCT Pub. No.: WO2009/013854
PCT Pub. Date: Jan. 29, 2009

(65) Prior Publication Data
US 2010/0219223 A1  Sep. 2, 2010

(30) Foreign Application Priority Data
Jul. 25, 2007  (JP) ................... 2007-193665

(51) Int. Cl.
*B26F 3/00* (2006.01)
(52) U.S. Cl. .................................. 225/104
(58) Field of Classification Search .......... 225/104, 225/96.5, 97, 103, 2, 96, 105, 93; 30/164.9, 30/164.95, 263, 306, 307, 92, 93, 95, 96, 30/98, 99, 102
See application file for complete search history.

(56) References Cited

U.S. PATENT DOCUMENTS

| | | | | |
|---|---|---|---|---|
| 2,300,087 A * | 10/1942 | Anello | ............................ | 30/90.9 |
| 3,494,521 A * | 2/1970 | Hellstrom | ..................... | 225/96.5 |
| 4,018,372 A * | 4/1977 | Insolio | ................................ | 225/2 |
| 4,940,176 A * | 7/1990 | Sato et al. | ..................... | 225/96.5 |
| 4,972,583 A * | 11/1990 | Pinchon | .......................... | 30/90.6 |
| 5,475,924 A * | 12/1995 | McDaniel | ......................... | 30/102 |
| 5,943,778 A * | 8/1999 | Alana | .............................. | 30/101 |
| 7,275,320 B2 * | 10/2007 | Lee | .................................. | 30/101 |
| D586,194 S * | 2/2009 | Haraguchi et al. | ................ | D8/52 |

FOREIGN PATENT DOCUMENTS

| | | |
|---|---|---|
| DE | 41 08 690 A1 | 4/1992 |
| JP | 3056772 | 12/1998 |
| JP | 11-228162 | 8/1999 |
| JP | 2000-44266 | 2/2000 |

* cited by examiner

*Primary Examiner* — Ghassem Alie
(74) *Attorney, Agent, or Firm* — McGlew and Tuttle, P.C.

(57) ABSTRACT

A manual breaker for cutting sheet glass. The manual breaker includes a rotational shaft (6) that rotatably holds first and second arms (2) and (4). A sheet glass having a scribe line formed thereon in advance is pinched among rollers (24) and (45). When handles (20) and (40) are actuated to narrow a distance between rollers (24) and (45), the roller (45) moves in a Y-axis direction and an impact shaft (51) impacts the sheet glass, accordingly. The sheet glass can be thereby easily cut into pieces along the scribe line and a sectional quality having a smooth cut surface can be ensured for the sheet glass.

12 Claims, 7 Drawing Sheets

F I G. 2
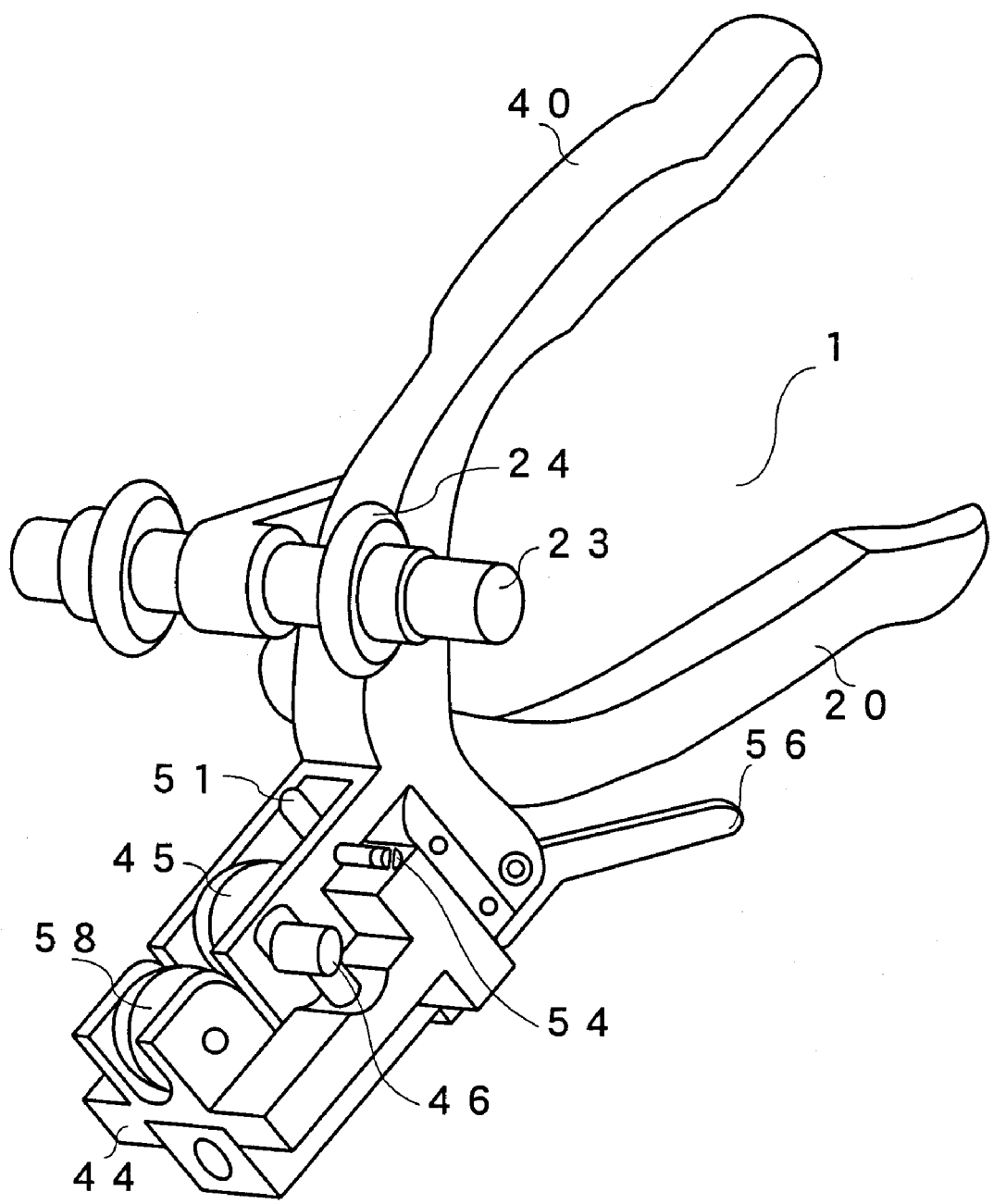

F I G. 4
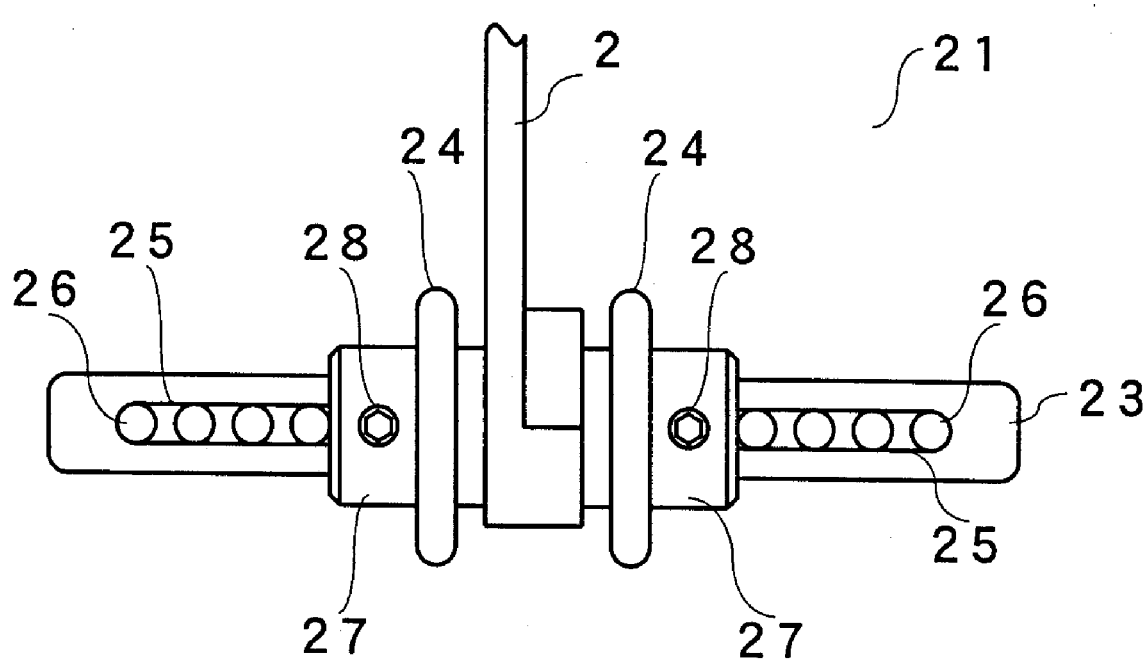

MANUAL BREAKER

TECHNICAL FIELD

The present invention relates to a manual breaker for cutting sheet glass into pieces and particularly relates to a manual breaker for easily cutting thick sheet glass into pieces.

BACKGROUND ART

Conventionally, sheet glass has almost always referred to glass having a thickness equal to or smaller than 10 millimeters (mm). Recently, however, thick sheet glass having a thickness larger than 10 mm and closer up to 25 mm has been used more frequently as sheet glass used for buildings. Following the frequent use of the thick sheet glass, need arises to cut such thick sheet glass into pieces of optimum sizes for each building. Accordingly, a breaker is desired so that a cut surface of sheet glass of any type including thick sheet glass is smooth and so as to be able to cut the sheet glass as easily as possible.

As a conventional manual breaker cutting sheet glass using so-called three-point bending, manual breakers disclosed in, for example, Patent Documents 1 and 2 are known. The manual breaker of the Patent Document 1 is a glass breaker for cutting thick sheet glass into pieces. According to the Patent Document 1, a lifting drive mechanism is provided at a lower position between two fixed support anvils and a movable pressurizing element is provided in an upper portion of this lifting drive mechanism. The lifting drive mechanism lifts up the movable pressurizing element, thereby moving sheet glass so as that the sheet glass adjoins the fixed support anvils. At this time, the two fixed support anvils and the movable pressurizing element pinch the sheet glass among them to create a state of three-point bending. Accordingly, if the lifting drive mechanism further lifts up the movable pressurizing element, the sheet glass is cut into pieces.

The manual breaker of the Patent Document 2 is a glass breaker for cutting sheet glass into pieces. This glass breaker is configured so that two holding elements are held in a width adjustment frame that is an upper frame, and so that a pressurizing element is held in a lower frame to face the two holding elements. Sheet glass is pinched among three points, that is, the two holding elements and the pressurizing element to create a state of three-point bending and a force of pinching the sheet glass is strengthened to thereby cut the sheet glass into pieces.

Patent Document 1: Japanese Unexamined Patent Publication No. 11-228162

Patent Document 2: Japanese Utility Model Registration No. 3056772.

DISCLOSURE OF INVENTION

Problems to be Solved by the Invention

The glass breaker of the Patent Document 1 is a large-sized breaker including an electric motor in a lifting drive mechanism, that is, the glass breaker is both heavy in weight and large in volume. This glass breaker is difficult to handle in actual working. Furthermore, in case of the glass breaker of the Patent Document 2, a force applied to the glass depends on person's grasping power. For this reason, the glass breaker is not suitable for ensuring easily cutting the above-stated thick sheet glass into pieces.

The present invention has been made to solve such conventional problems, and it is an object of the present invention to provide a manual breaker capable of ensuring that sheet glass of any type including thick sheet glass has a sectional quality of a smooth cut surface and capable of cutting the sheet glass into pieces as easily as possible.

Means to Solve the Problems

To solve the problem, a manual breaker of the present invention comprises: first and second arms connected to each other by a rotational shaft, wherein said first arm comprises: a handle; a rotational shaft hole, said rotational shaft penetrating through the rotational shaft hole; and first and second rollers provided at symmetrical positions to said handle across said rotational shaft, respectively, provided to be symmetrical to each other along a direction perpendicular to said rotational shaft, and rotatably held, wherein said second arm comprises: a handle; a rotational shaft hole, said rotational shaft penetrating through the rotational shaft hole; and an impactor provided at a symmetrical position to said handle across said rotational shaft, and pinching a sheet glass by actuation of the respective handles of said first and second arms while facing said first and second rollers, and wherein said impactor comprises: a third roller facing said first and second rollers, and slidably held so as to change a distance between said first and second rollers; a trigger member moving between a standby position and a release position according to vertical movement of said third roller; an impact shaft held at a predetermined position in advance when said trigger member is at the standby position, urged to move from the predetermined position to press said first and second rollers by movement of said trigger member to the release position, thereby impacting said sheet glass; and a tension coil spring urging said impact shaft toward said sheet glass.

Said impaction may further comprise a lever engaged with said impact shaft and moving said trigger member to the standby position.

Said impaction may further comprise a fourth arm holding said sheet glass when said third roller is pressed.

In the manual breaker, the rotational shaft hole of said second arm may be an oblong hole changing the distance between said first and second rollers.

Effectiveness of the Invention

According to the present invention having these characteristics, sheet glass of any type including thick sheet glass can be easily cut into pieces. Furthermore, it is possible to ensure a sectional quality of a smooth cut surface of the sheet glass when the sheet glass is cut into pieces.

BRIEF DESCRIPTION OF DRAWINGS

FIG. 2 is a perspective view showing the manual breaker according to the embodiment of the present invention.

FIG. 4 is a plan view showing rollers of the manual breaker according to the embodiment of the present invention.

DESCRIPTION OF REFERENCE NUMERALS

Figure 1:
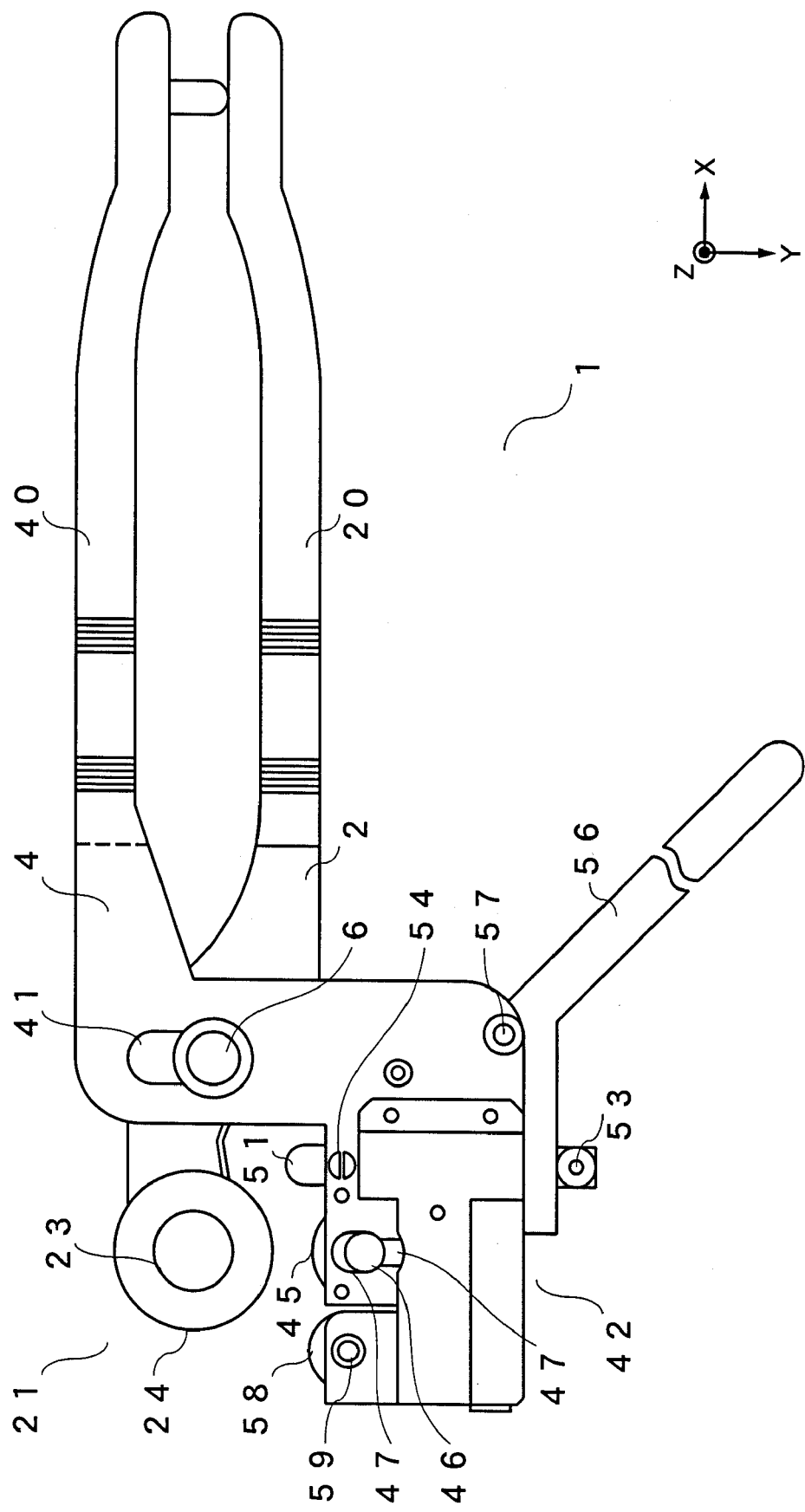
FIG. 1 is a side view showing a manual breaker according to an embodiment of the present invention.

1 Manual breaker
2 First arm
4 Second arm
6 Rotational axis
20, 40 Handle
21 Roller head
22 Main body shaft
23 Roller shaft
24, 45 Roller
25 Guide groove
26 Guide hole
27 Roller guide
28 Bolt
41 Guide hole
42 Impactor
43 Guide hole
44 Mount
46 Shaft
47 Shaft guide hole
48 Actuation piece
49 Piston
50 Compression spring
51 Impact shaft
55 Tension coil spring
56 Lever
58 Load roller

BEST MODE FOR CARRYING OUT THE INVENTION

Figure 3:
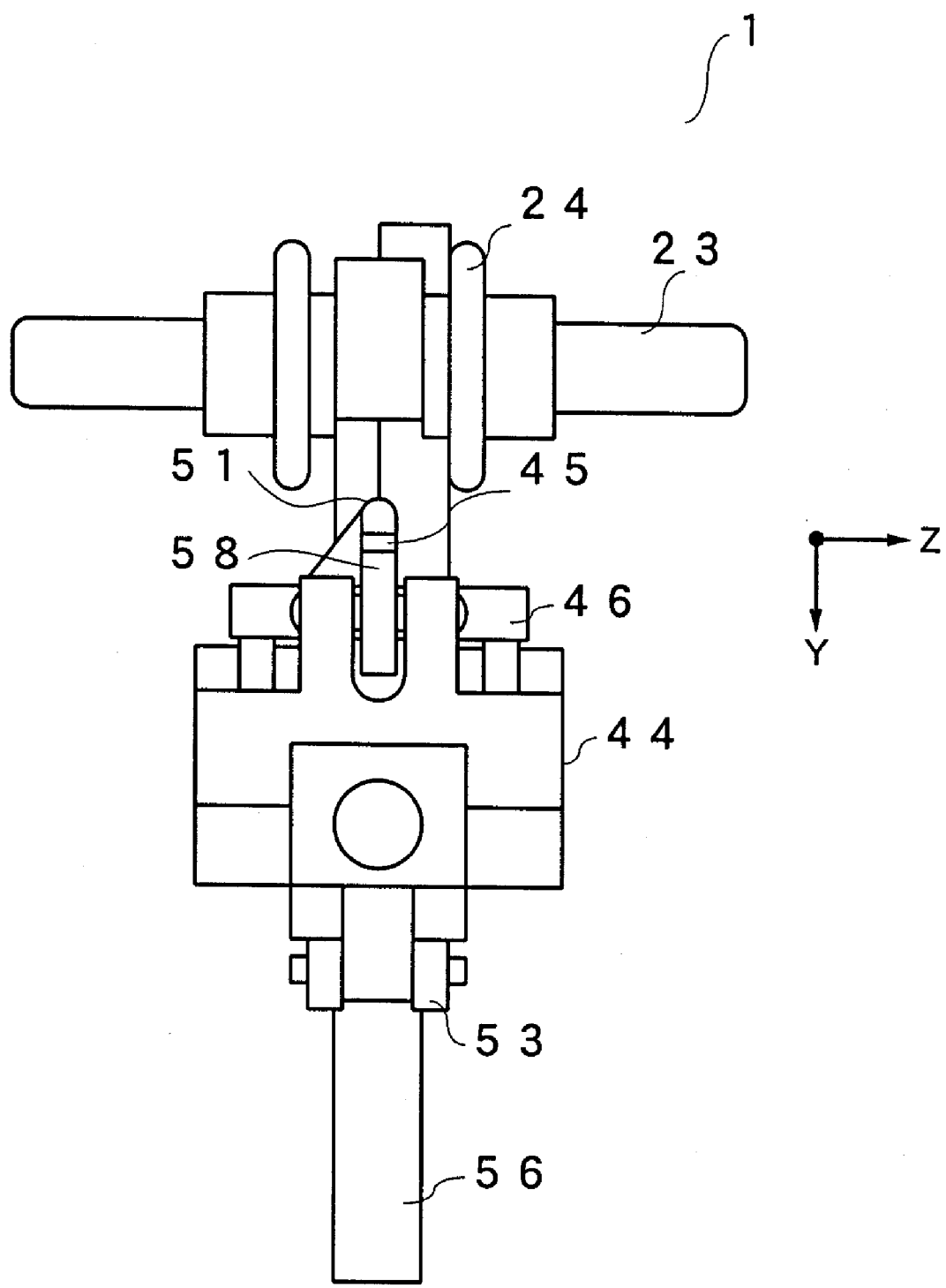
FIG. 3 is a front view showing the manual breaker according to the embodiment of the present invention.

FIG. 1 is a side view of a manual breaker 1 according to an embodiment of the present invention, and FIG. 2 is a perspective view of the manual breaker 1. FIG. 3 is a front view of the manual breaker 1 from a positive direction of an X-axis.

In the manual breaker 1, a rotational shaft 6 connects a first arm 2 to a second arm 4. The first arm 2 includes a handle 20, a rotational shaft hole through which a rotational shaft penetrates, and a roller head 21 provided at a symmetrical position to the handle 20 across the rotational shaft hole. The second arm 4 includes a handle 40, a guide hole 41 through which the rotational shaft penetrates, and an impactor 42 provided at a symmetrical position to the handle 40 across the guide hole 41. The guide hole 41 is an oblong rotational shaft hole along a Y-axis direction. The rotational shaft 6 penetrates through the rotational shaft hole of the first arm 2 and the guide hole 41 of the second arm 4 in parallel to a Z-axis, and the first and second arms 2 and 4 are rotatable relatively to each other. Therefore, a distance between the roller head 21 and impactor 42 can be changed by rotating the first arm 2 and second arm 4 around the rotational shaft 6 and translating the first arm 2 and second arm 4 in a length direction of the guide hole 41.

Constituent elements of the manual breaker 1 will be specifically described in detail.

(Roller Head)

The roller head 21 will be described referring to FIG. 4. FIG. 4 is a plan view of the roller head 21 if a manual breaker main body is viewed from the Y-axis direction. The roller head 21 has a cylindrical roller shaft 23 fixed along the Z-axis so that left and right lengths of the roller shaft 23 are almost equal to each other. The roller shaft 23 rotatably holds a pair of first and second rollers 24, and guide grooves 25 are formed along the shaft bilaterally symmetrically. Five guide holes 26 are provided in a row in each of the left and right guide grooves 25.

Each roller 24 coaxially adjoins a cylindrical roller guide 27 about mutual surfaces. Each of the roller 24 and roller guide 27 includes a circular through-hole having a diameter almost equal to that of the roller shaft 23. By inserting the roller shaft 23 into these through-holes, the roller shaft 23 holds the rollers 24 and roller guides 27. As shown in FIG. 4, the roller guide 27 includes a guide shaft setscrew 28. By fitting the guide shaft setscrew 28 into one of the guide holes 26, a position of the roller 24 is fixed. FIG. 4 shows a state in which guide shaft setscrews 28 are fitted into the guide holes 26 closest to the first arm 2, respectively, thereby fixing the rollers 24.

(Impactor)

Figure 5A:
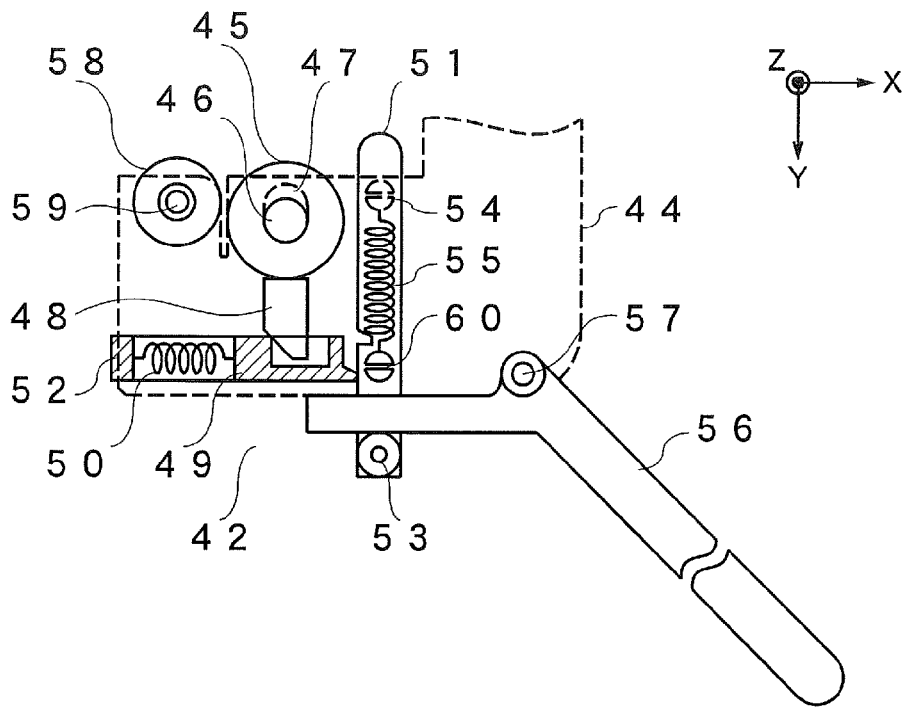
FIG. 5A is a side view showing an internal configuration of an impactor of the manual breaker according to the embodiment of the present invention.
Figure 5B:
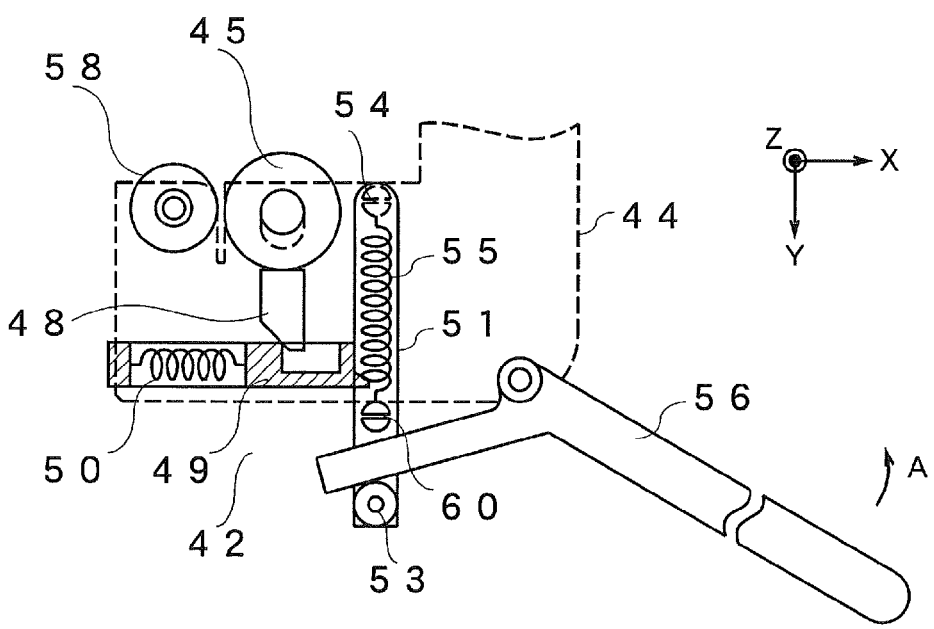
FIG. 5B is a side view showing the internal configuration of the impactor of the manual breaker according to the embodiment of the present invention.

The impactor 42 will next be described referring to FIGS. 1, 2, 5A and 5B. FIGS. 5A and 5B are side views showing an internal configuration of the impactor 42 from the same direction as that of FIG. 1.

Constituent members of the impactor 42 are attached to a rectangular parallelepiped mount 44 indicated by a broken line. In FIGS. 5A and 5B, the members attached to the mount 44 are indicated by solid lines. The mount 44 rotatably holds a third roller 45 along a shaft 46 and includes an oblong shaft guide hole 47 through which the shaft 46 penetrates. The roller 45 adjoins an actuation piece 48 in a lower portion of the roller 45 and moves according to vertical movement of the actuation piece 48 vertically (in the Y-axis direction). However, movement of the roller 45 is limited to a range in which the shaft 46 can move vertically within the shaft guide hole 47. In FIG. 5A, the roller shaft 46 is located in the lowermost portion of the shaft guide hole 47.

The actuation piece 48 is a member produced by cutting a cylinder on a plane from a bottom surface to a side surface of the cylinder. The actuation piece 48 includes a lower protruding end. A piston 49 is provided below the actuation piece 48 and the piston 49 adjoins the protruding end of the actuation piece 48. The piston 49 is movable in a certain range in parallel to the X-axis. The piston 49 includes a convex portion on a right end of the piston 49 and a notch almost in the middle of an entire length of the piston 49. As shown in FIG. 5A, an edge of the notch of the piston 49 adjoins an inclined surface of the protruding end of the actuation piece 48. A compression spring 50 urges the piston 49 in the positive direction of the X-axis and the piston 49 adjoins an impact shaft 51. As shown in FIG. 5A, the compression spring 50 is arranged between the piston 49 and a plug 52 fixed to the mount 44.

In the present embodiment, the actuation piece 48, piston 49, and compression spring 50 constitute a trigger member. The trigger member moves between a release position shown in FIG. 5A and a standby position shown in FIG. 5B based on vertical movement of the roller.

The impact shaft 51 is, for example, a cylindrical member and movable in a certain range along the Y-axis. The impact shaft 51 has one end that is generally semispherical and the other end on which a pin 53 is provided. The impact shaft 51 includes a notch almost in the middle of an entire length of the impact shaft 51 and a pin 52 adjacent to the notch. A tension coil spring 55 is provided between the pin 60 of the impact shaft 51 and a pin 54 fixed to the second arm 4. A pin 57 holds a lever 56 below the impactor 42 so that the lever 56 is rotatable about the second arm 4. As shown in FIG. 5A, an operating point of the lever 56 abuts on the pin 53. As shown in FIG. 5A, the tension coil spring 55 attracts the impact shaft 51 upward and, at the same time, the lever 56 holds the impact shaft 51 at a position at which the impact shaft 51 abuts on the second arm 4.

A load roller 58 is provided adjacent to the roller 45. The load roller 58 is a fourth roller rotatably held by the mount 44 via a shaft 59. The load roller 58 holds a sheet glass when the roller 45 is pressed.

Figure 6:
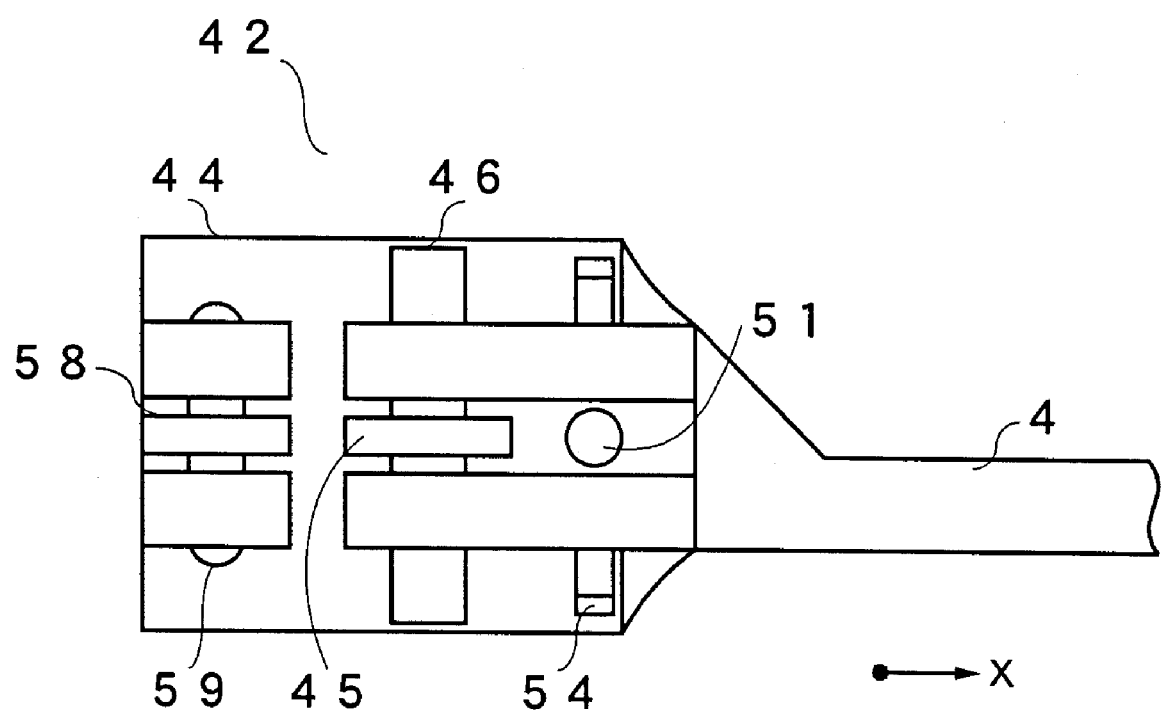
FIG. 6 is a plan view of the impactor of the manual breaker from a roller side according to the embodiment of the present invention.

FIG. 6 is a plan view of the impactor 42 shown in FIG. 1 from a positive direction of the Y-axis. FIG. 6 shows the second arm 4, roller 45, impact shaft 51, load roller 58, and shaft 59. The respective elements shown in FIG. 6 are arranged to be bilaterally symmetrically.

Figure 7:
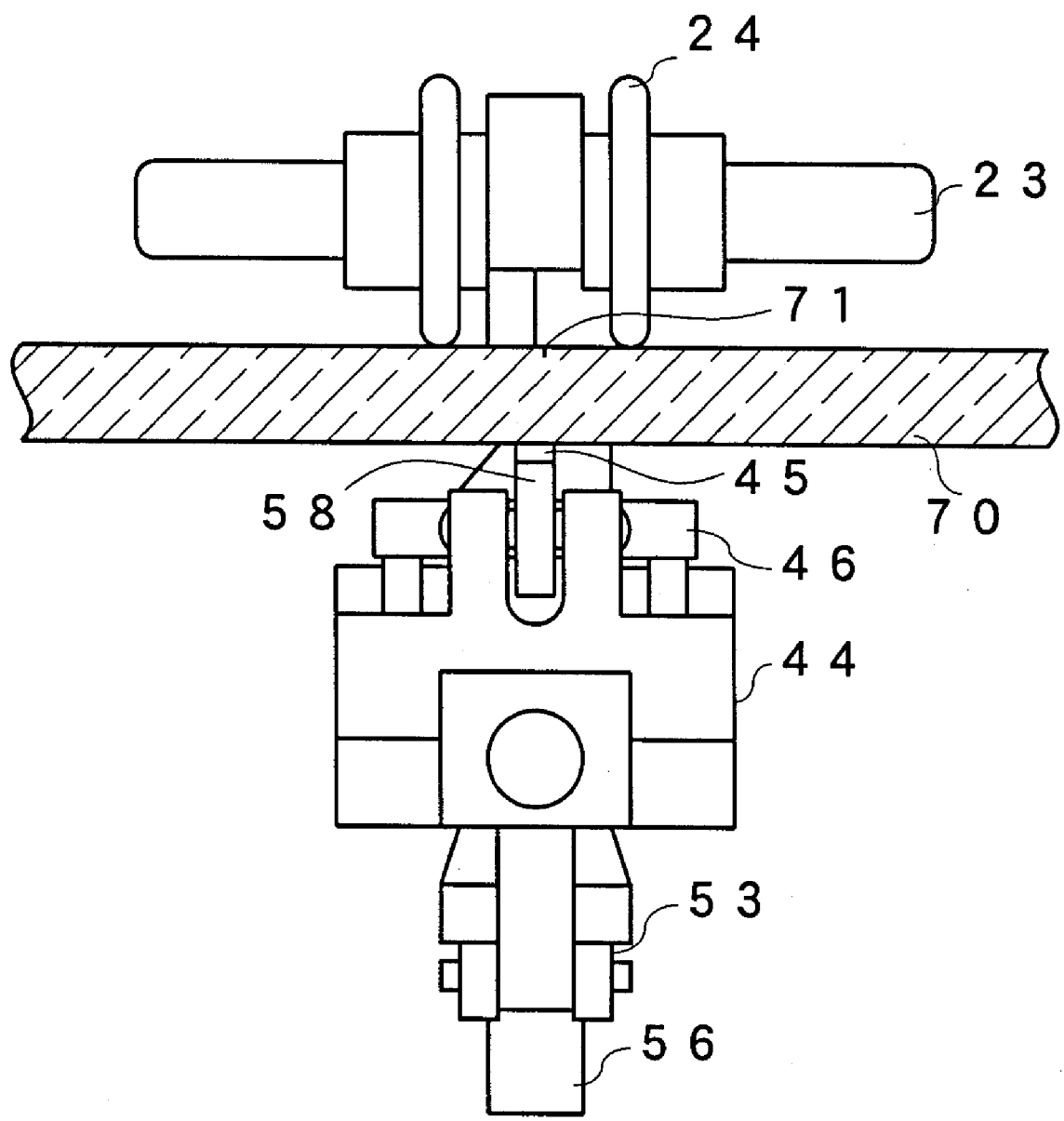
FIG. 7 is a front view showing a state in which the manual breaker pinches a thick sheet glass according to the embodiment of the present invention.

A method of cutting a thick sheet glass using the manual breaker 1 according to the present embodiment will next be described referring to FIG. 7. First, a scribe line 71 is drawn on a thick sheet glass 70 along a to-be-cut line. Next, a distance between the two rollers 24 is adjusted according to dimensions and a thickness of the thick sheet glass 70.

The lever 56 of the impactor 42 is rotated counterclockwise about the pin 57. If the lever 56 is rotated counterclockwise from a state shown in FIG. 5A, then the operating point of the lever 56 presses down the pin 53, the impact shaft 51 moves downward, and a convex portion of the piston 49 is fitted into the notch of the impact shaft 51. By so fitting, a position of the impact shaft 51 is fixed and a state of the impactor 42 is changed into a state shown in FIG. 5B. At this time, a distance between the pins 60 and 54 increases and the tension coil spring 55 extends. Further, when the piston 49 moves in a direction of the impact shaft 51, a contact point between the notch of the piston 49 and the protruding end of the actuation piece 48 changes as shown in FIGS. 5A and 5B. Accordingly, a position of the actuation piece 48 shown in FIG. 5B moves upward, as compared with FIG. 5A. The roller 45 is pressed upward according to this movement of the actuation piece 48. At this time, the roller shaft 46 is located in an uppermost portion of the shaft guide hole 47. In this state, the thick sheet glass 70 does not adjoin the impact shaft 51 and the trigger member is located at a standby position.

The manual breaker 1 is arranged with respect to the thick sheet glass 70 so that a surface of the thick sheet glass 70 on which the scribe line 71 is drawn adjoins the two rollers 24 and so that the scribe line 71 is located at a center position between the two rollers 24. FIG. 7 is a front view showing a state in which the manual breaker 1 pinches the thick sheet glass in a manner stated above. The load roller 58, roller 45, and impact shaft 51 are located below the scribe line 71. When the thick sheet glass 70 is strongly pinched by applying a force to the handles 20 and 40 in this state, the thick sheet glass 70 presses down the roller 45 and a moment of three-point bending generated by the two rollers 24 and the roller 45 concentrates on the scribe line 71. At this time, a lower end of the roller 45 presses down the actuation piece 48 to gradually move the piston 49 in a negative direction of the X-axis. When the rollers 45 and 58 are almost flush with each other, the convex end of the piston 49 breaks out the notch of the impact shaft 51 and the trigger member is, therefore, located at the release position. At this moment, the tension coil spring 55 causes the impact shaft 51 to spring up and the state of the impactor 42 changes from that shown in FIG. 5B to that shown in FIG. 5A. The impact shaft 51 sprung up by the tension coil spring 55 impacts the thick sheet glass 70 with quite a strong force. Impact at that time as well as the force applied to the handles 20 and 40 extends a crack in a depth direction of the scribe line 71 on which the bending moment concentrates. Since the crack further extends along the scribe line, the thick sheet glass 70 is cut into pieces along the scribe line 71.

The manual breaker 1 according to the present embodiment generates a sufficient bending moment on the scribe line 71 and then allows the impact shaft 51 to trigger extension of the crack of the scribe line 71, so that the crack extends and cutting is completed in short time. It is thereby possible to easily cut the thick sheet glass into pieces and obtain a cut surface having a smooth sectional quality.

While a material of the main body of the manual breaker 1 is preferably metal, the rollers 24, roller 45, impact shaft 51, load roller 58 and the like adjoining the thick sheet glass are preferably made of resin such as plastic or hard rubber so as to prevent damage on the glass. Alternatively, a material other than the metal may be used for the main body of the manual breaker 1 as long as the other material can ensure necessary strength for the main body of the manual breaker 1. A material other than the resin or hard rubber may be used for the elements adjoining the thick sheet glass as long as the material does not damage the glass.

In the present embodiment, the actuation piece 48, piston 49, and compression spring 50 form the trigger member. Alternatively, various other constituent elements can be used for the trigger member as long as the elements can ensure setting the impact shaft 51 from a standby state to a release state according to the movement of the roller 45 in the Y-axis direction.

Industrial Applicability

The present invention can cut sheet glass of any type including thick sheet glass into pieces along a scribe line. Due to this, the present invention is used to cut glass of various thicknesses into pieces.

The invention claimed is:

1. A manual breaker comprising:
   first and second arms connected to each other by a rotational shaft, wherein said first arm comprises:
   a first handle;
   a rotational shaft hole, said rotational shaft penetrating through the rotational shaft hole;
   a roller head provided at a symmetrical position to said first handle across said rotational shaft, said roller head having a roller shaft and a pair of first and second rollers, said first and second rollers being rotatably held along said roller shaft,
   a second handle;
   a rotational shaft hole, said rotational shaft penetrating through the rotational shaft hole; and
   an impactor facing said first and second rollers of said roller head, said impactor being provided at a symmetrical position to said second handle across said rotational shaft, said impactor pinching a sheet glass by actuation of said first handle and said second handle, and
   wherein said impactor comprises:
   a mount;
   a third roller facing said first and second rollers, and slidably held on said mount so as to change a distance to said first roller and a distance to said second roller;
   a trigger member moving between a standby position and a release position according to vertical movement of said third roller;
   an impact shaft held at a predetermined position in advance when said trigger member is at the standby position, and moves from said predetermined position to said sheet glass and impacts said sheet glass such that said first and second rollers push said sheet glass by movement of said trigger member to the release; and a tension coil spring urging said impact shaft toward said sheet glass.

2. The manual breaker according to claim 1, wherein said impactor further comprises a lever engaged with said impact shaft and moving said trigger member to the standby position.

3. The manual breaker according to claim 1, wherein said impactor further comprises a fourth roller holding said sheet glass when said third roller is pressed.

4. The manual breaker according to claim 1, wherein the rotational shaft hole of said second arm is an oblong hole so as to change said distance to said first roller and said distance to said second roller.

5. A manual breaker comprising:

a rotational shaft;

a first arm comprising a first handle, a first arm rotational shaft hole and a roller head, said roller head being located on a first side of said rotational shaft hole, said roller head comprising a roller shaft, a first roller and a second roller, said first roller and said second roller being rotatably connected to said roller shaft, at least a portion of said rotational shaft extending through said rotational shaft hole;

a second arm comprising a second handle, a second arm rotational shaft hole and an impactor, said first arm being connected to said second arm via said rotational shaft, at least another portion of rotational shaft extending through said second arm rotational shaft hole, said impactor being opposite said first roller and said second roller, said impactor being located on said first side of said rotational shaft hole, said impactor engaging a sheet of glass via actuation of said first handle and said second handle, said impactor comprising a mount element, a third roller, a trigger member, an impact shaft and a tension coil, said third roller being opposite said first roller and said second roller, said third roller being mounted to said mount element for movement such that said third roller is movable to change a distance between said first roller and said third roller and to change a distance between said third roller and said second roller, said trigger member moving between a standby position and a release position based on vertical movement of said third roller, said impact shaft being at a predetermined position with said trigger member in said standby position, wherein said impact shaft moves from said predetermined position to said sheet glass and said impact shaft engages said sheet glass such that said first roller and said second roller push said sheet glass by movement of said trigger member to the release position, said tension coil spring applying a force to said impact shaft such that said impact shaft is moved toward said sheet glass when said trigger element moves from said standby position to said release position.

6. The manual breaker according to claim 5, wherein said impactor further comprises a lever engaged with said impact shaft and moving said trigger member to the standby position.

7. The manual breaker according to claim 5, wherein said impactor further comprises a fourth roller holding said sheet glass when said third roller is pressed.

8. The manual breaker according to claim 5, wherein said second arm rotational shaft hole is an oblong hole.

9. A manual breaker comprising:

a rotational shaft;

a first arm comprising a first handle, a first arm rotational shaft hole and a roller head, said roller head being located on a first side of said rotational shaft hole, said roller head comprising a roller shaft, a first roller and a second roller, said first roller and said second roller being rotatably connected to said roller shaft, at least a portion of said rotational shaft extending through said rotational shaft hole;

a second arm comprising a second handle, a second arm rotational shaft hole and an impactor, said first arm being connected to said second arm via said rotational shaft, at least another portion of rotational shaft extending through said second arm rotational shaft hole, said impactor being opposite said first roller and said second roller, said impactor being located on said first side of said rotational shaft hole, said first roller and said second roller being arranged at a position above said impactor, said impactor engaging a sheet of glass via actuation of said first handle and said second handle, said impactor comprising a mount element, a third roller, a trigger member, an impact shaft and a tension coil, said third roller being opposite said first roller and said second roller, said third roller being mounted to said mount element for movement such that said third roller is movable to change a distance between said third roller and one or more of said first roller and said second roller, said trigger member moving between a standby position and a release position based on vertical movement of said third roller, said impact shaft being at a predetermined position with said trigger member in said standby position, wherein said impact shaft moves from said predetermined position to said sheet glass and said impact shaft engages said sheet glass such that said first roller and said second roller push said sheet glass when said trigger member moves from said standby position to said release position, said tension coil spring applying a force to said impact shaft such that said impact shaft is moved toward said sheet glass when said trigger member moves from said standby position to said release position.

10. The manual breaker according to claim 9, wherein said impactor further comprises a lever engaged with said impact shaft and moving said trigger member to the standby position.

11. The manual breaker according to claim 9, wherein said impactor further comprises a fourth roller holding said sheet glass when said third roller is pressed.

12. The manual breaker according to claim 9, wherein said second arm rotational shaft hole is an oblong hole.

* * * * *